(12) United States Patent  
Griffin et al.

(10) Patent No.: US 9,122,315 B2  
(45) Date of Patent: Sep. 1, 2015

(54) EXPANDABLE KEYBOARD

(75) Inventors: Jason Tyler Griffin, Kitchener (CA); Roman Peter Rak, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 281 days.

(21) Appl. No.: 13/312,734

(22) Filed: Dec. 6, 2011

(65) Prior Publication Data

US 2013/0142558 A1    Jun. 6, 2013

(51) Int. Cl.
*B41J 5/00* (2006.01)
*G06F 3/02* (2006.01)

(52) U.S. Cl.
CPC ............ *G06F 3/0221* (2013.01); *G06F 3/0216* (2013.01)

(58) Field of Classification Search
CPC ................ B41J 5/00; B41J 5/10; B41J 29/02; B41J 29/023; G06F 3/02; G06F 3/0221; G06F 3/0216
USPC .................................................. 400/472–496
See application file for complete search history.

(56) References Cited

U.S. PATENT DOCUMENTS

| 5,044,798 | A | * | 9/1991 | Roylance et al. ............. 400/472 |
| 5,938,353 | A | * | 8/1999 | Butler ............................ 400/492 |
| 6,056,456 | A |   | 5/2000 | Kinoshita |
| 6,068,417 | A |   | 5/2000 | Butler |
| 6,331,850 | B1 | * | 12/2001 | Olodort et al. ................ 345/168 |
| 6,536,966 | B1 | * | 3/2003 | Butler ............................ 400/492 |
| 6,950,038 | B2 | * | 9/2005 | Hsu .................................. 341/22 |
| 2003/0156878 | A1 | * | 8/2003 | Cauwels ....................... 400/472 |
| 2011/0002092 | A1 | * | 1/2011 | Bestle et al. ............. 361/679.01 |

FOREIGN PATENT DOCUMENTS

| DE | 4342122 C1 | 4/1995 |
| JP | 9311744 A | 12/1997 |
| WO | 2001-056803 A1 | 8/2001 |

OTHER PUBLICATIONS

Article 94(3) EPC from related European Patent Application No. 12157346.3 dated Mar. 5, 2013; 4 pages.
Canadian Office Action from related Canadian Patent Application No. 2,770,017 dated Dec. 16, 2013; 2 pages.
Canadian Office Action from related Canadian Patent Application No. 2,770,017 dated Jan. 16, 2015; 3 pages.

* cited by examiner

*Primary Examiner* — Nguyen Ha
(74) *Attorney, Agent, or Firm* — Thomas Grzesik; Fleit Gibbons Gutman Bongini & Bianco P.L.

(57) ABSTRACT

A keyboard includes a housing, a frame surrounding the housing, and a plurality of keys arranged in a plurality of columns and a plurality of rows. The keyboard is movable between a closed configuration and an expanded configuration, and the keys are accessible in both the closed and expanded configurations.

17 Claims, 8 Drawing Sheets

EXPANDABLE KEYBOARD

BACKGROUND OF THE DISCLOSURE

This disclosure is directed to keyboards, and more specifically to a keyboard accessory for an electronic device. Conventional keyboard accessories for laptops, tablet devices and/or handheld devices are typically reduced in size so as to be portable and easy to carry. While such keyboards are lightweight and portable, the typing surface and key size is also reduced, which may make it difficult to type or reduce comfort for some users. Further, some users may wish to utilize a reduced size keyboard in some instances (such as at an airport or in a restaurant, for example), but may desire to use a full sized keyboard in other instances (such as when working at home, for example).

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Figure 1A:
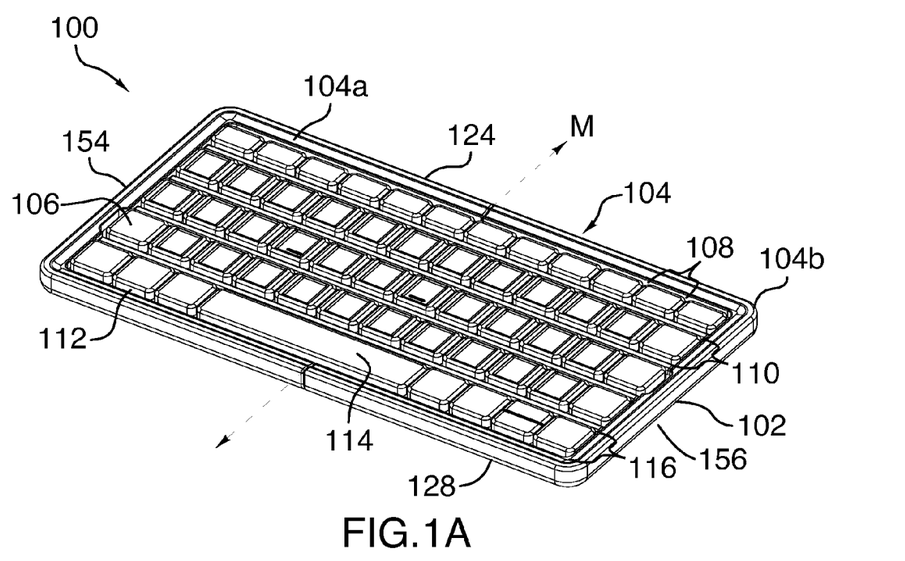
FIG. 1A is a top perspective view of an expandable keyboard in a closed configuration in accordance with the present disclosure.
Figure 1B:
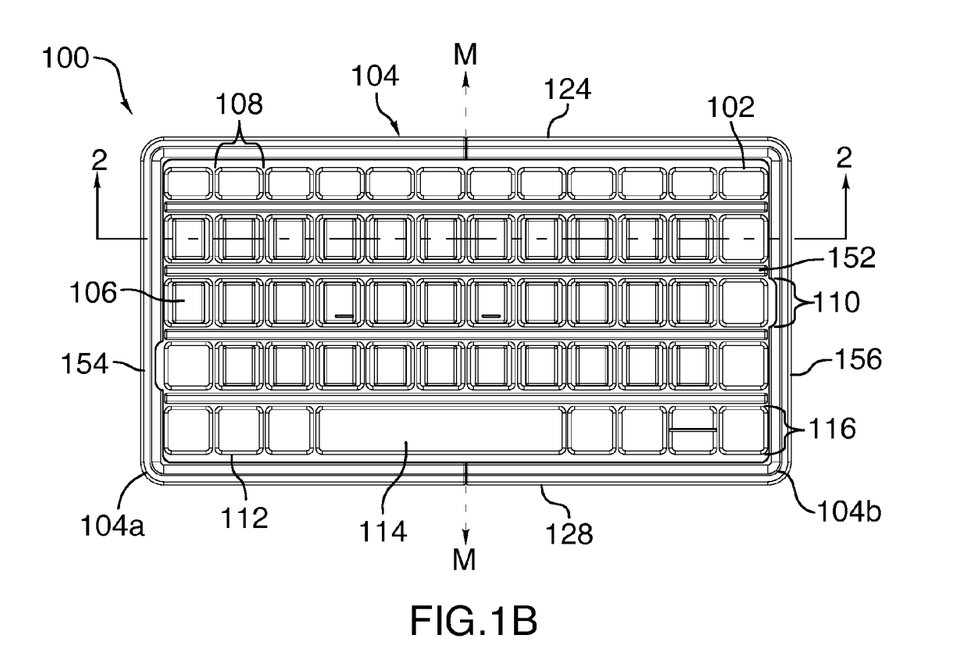
FIG. 1B is a top plan view of the keyboard in the closed configuration.

Turning now to FIGS. 1A and 1B, a keyboard 100 in accordance with the present disclosure is shown in a closed configuration. The keyboard 100 includes a housing 102, a frame 104 surrounding the housing, and a plurality of keys 106 arranged in a plurality of columns 108 and a plurality of rows 110. Both the frame 104 and the housing 106 are composed of a rigid material such as a plastic or other similar material that will allow the keyboard 100 to maintain its shape. The frame 104 surrounds an outer periphery of the housing 106 and in the keyboard 100, includes a first half 104a and a second half 104b. In the present keyboard 100, the first half 104a and the second half 104b are substantially C-shaped portions (with the first half 104a and the second half 104b being mirror-images of each other) that meet each other at a midline M of the keyboard, as seen in FIG. 1B.

As will be described in further detail below, the keyboard 100 is movable between the closed configuration and an expanded configuration (FIG. 2), with the keys 106 being accessible in both the closed and expanded configurations. Each of the keys 106 has a corresponding key cap 112 that can have an associated indicia printed thereon, such as an alphabetic character, a number, a function, and/or a symbol, for example. The indicia of each of the keys 106 in a corresponding one of the columns 108 can be either vertically aligned with or vertically offset from an adjacent one of the keys in the corresponding column. The key caps 112 are manufactured from a rigid material such as a thermoplastic or other similar material that provides tactility to a user and that maintains its shape during use. In the present keyboard 100, the keys 106 are substantially rectangular in shape, although it is appreciated that the keys are not limited to such a configuration.

In the closed configuration, each of the keys 106 in a corresponding one of the columns 108 is vertically aligned with each other. In other words, in the closed configuration of the keyboard 100, each of the keys 106 in column 108a, for example, are vertically aligned with each other, as are the keys in column 108b, 108c, and so forth. The only exception to this aligned arrangement is a space bar 114 in a bottom row 116 of the keyboard 100: as seen in FIG. 1B, the space bar 114 extends the width of five keys 106 and accordingly is not vertically aligned with those keys that are located in the columns directly above the space bar. However, the outer edges of the space bar 114 are aligned with outer edges of corresponding columns, as shown in FIG. 1B.

Figure 1C:
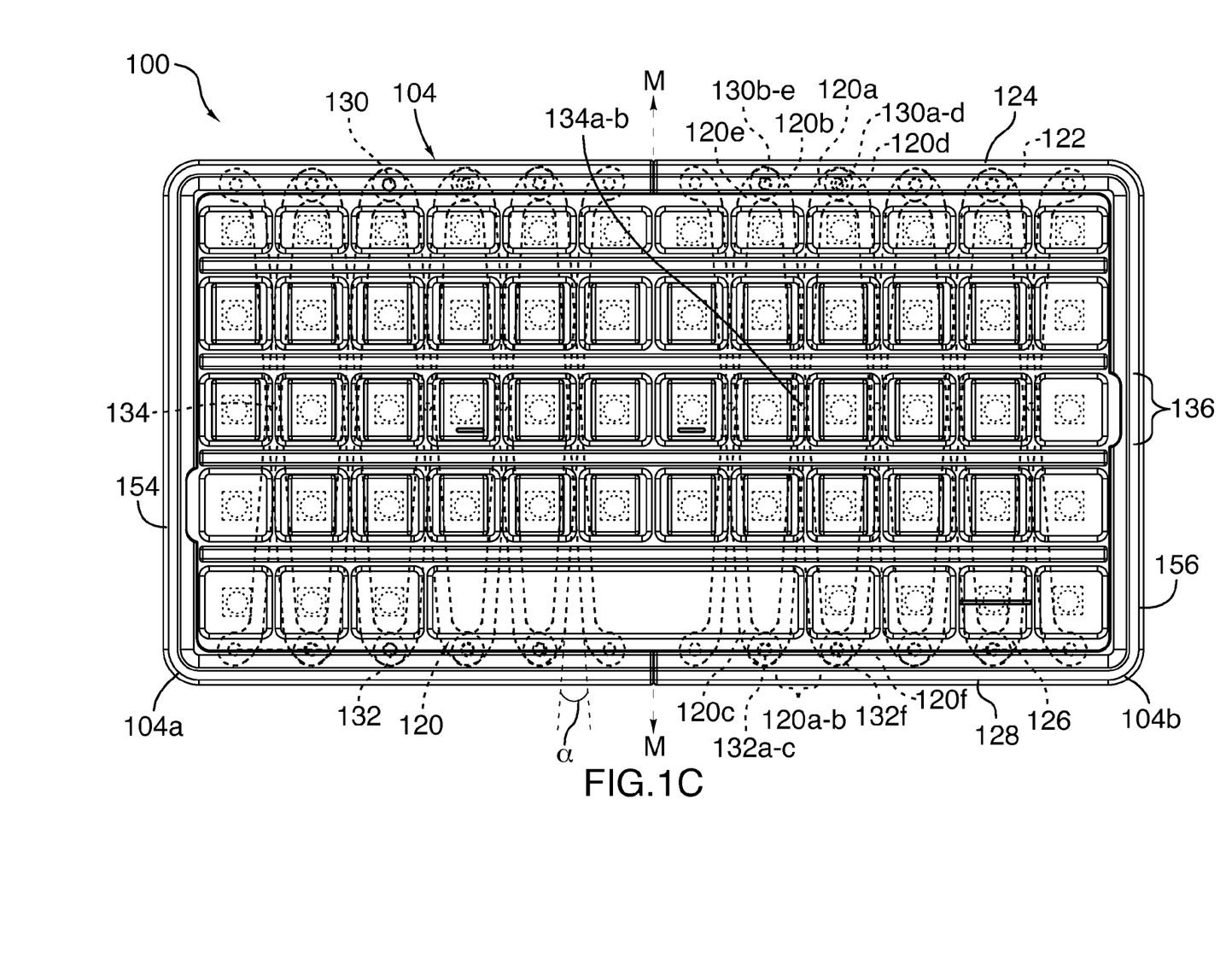
FIG. 1C is a top plan view of the keyboard showing an expansion mechanism housed within the keyboard when the keyboard is in the closed configuration.
Figure 2A:
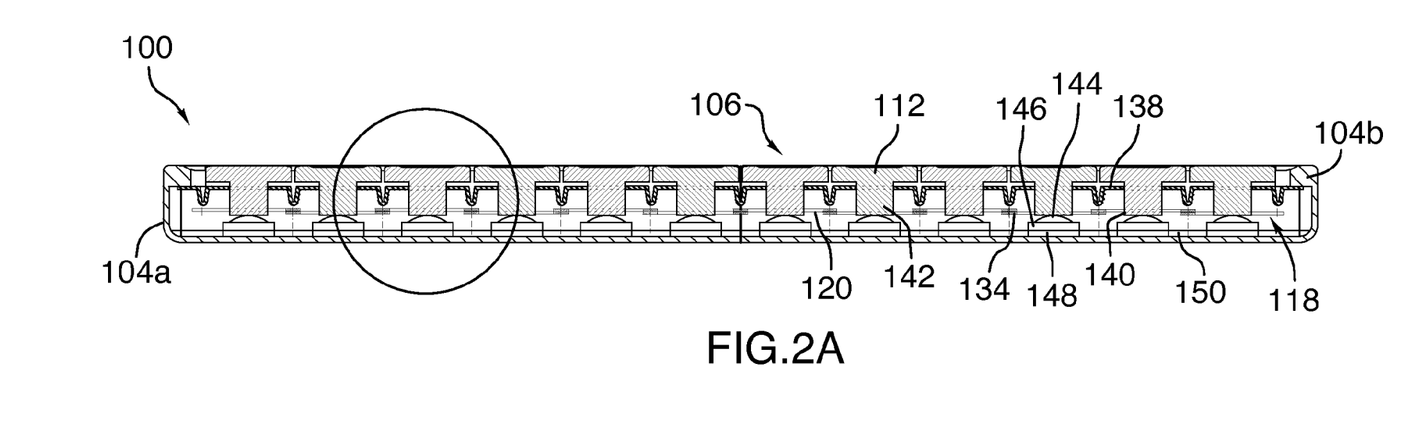
FIG. 2A is a cross-section front view of the keyboard in FIG. 1B taken along the line 2-2 and in the direction indicated.
Figure 2B:
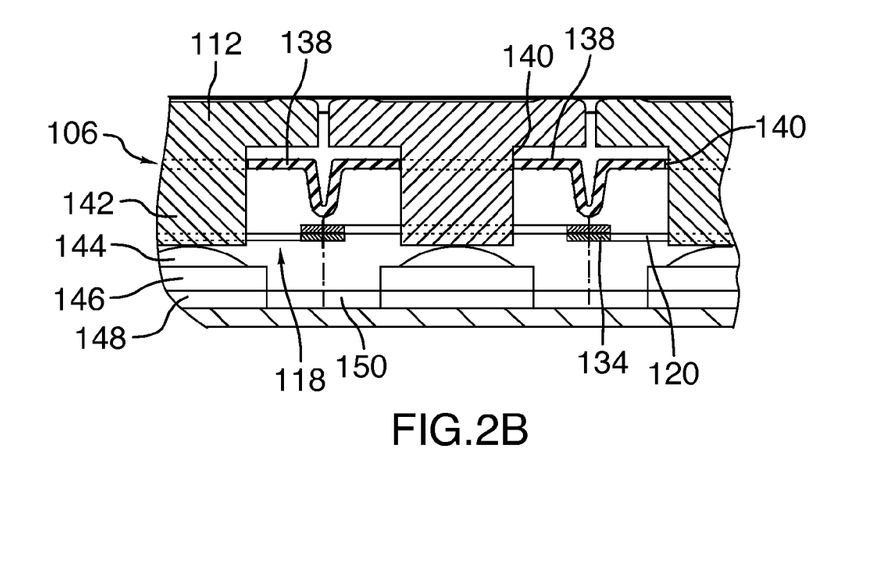
FIG. 2B is a close up cross-section front view of the keyboard in FIG. 2A.

Referring now to FIGS. 1C, 2A and 2B, the keyboard 100 includes an expansion mechanism 118 (shown in broken lines in FIG. 1C) provided in the housing 102 and configured for enabling movement of the keyboard between the closed and the expanded configurations. In the present disclosure, the expansion mechanism 118 is a "scissor-like" mechanism that includes a plurality of arms 120 that are each attached to the frame 104. However, it is recognized that alternative sliding mechanisms for expanding and closing the keyboard may be suitable, such as an over-center spring mechanism, for example.

More specifically, each arm 120 is attached at a first end 122 thereof to a first or top side 124 of the frame 104, and at a second end 126 thereof to a second or bottom side 128 of the frame, where the top and bottom sides of the frame are substantially parallel to each other and spaced apart by an amount approximate to a length of the arms 120. The arms 120 are secured to the top side 124 of the frame by a corresponding top pivot pin 130, and are secured to the bottom side 128 of the frame by a corresponding bottom pivot pin 132. To form a scissor or lattice-like structure, pairs of the arms 120 are joined together at their respective midpoints by a central pivot pin 134, as shown in FIG. 1C, such that the attached pairs of arms form an "X" shape.

In the closed configuration shown in FIG. 1C, the pairs of arms 120 define an angle a at the central pin 134. The location of the central pin 134 corresponds to a middle row 136 of the keyboard 100. To further maintain fluid movement and to provide additional connection between adjacent pairs of arms 120, each arm 120 in a corresponding pair is further connected to an adjacent arm in an adjacent pair at the top and bottom pivot pins 130, 132.

For example and as shown in FIG. 1C, arms 120a and 120b form a pair 120a-b, and are secured together by a central pin 134a-b. To further secure the pair of arms 120a-b to adjacent arms 120, the second end 126 of arm 120a is secured to adjacent arm 120c at bottom pin 132a-c, and the first end 122 of arm 120a is secured to adjacent arm 120d at top pin 130a-d. Similarly, the first end 122 of arm 120b is secured to adjacent arm 120e at top pin 130b-e, and the second end 126 of arm 120b is secured to adjacent arm 120f at bottom pin 132b-f. A similar arrangement continues throughout the expansion mechanism 118 between adjacent arms 120 and accordingly will not be further described herein. Such a configuration ensures indirect and/or direct connection between the arms 120 and enables fluid and smooth transitioning of the keyboard between the closed and expanded configurations.

Referring now to FIGS. 2A and 2B, the expansion mechanism 118 is located within the housing 102 of the keyboard 100, and is arranged such that it does not interfere with the functionality of the keys 106. To hide the expansion mechanism 118 from view, the keyboard 100 includes a bellows or webbing 138 that surrounds the keys 106 and in addition to hiding the expansion mechanism 118 from external view, also prevents ingress of dirt and/or moisture into the keyboard 100. The bellows 138 defines a plurality of openings 140 configured to receive a corresponding one of the keys 106. More specifically, each of the keys 106 includes a key stem or actuator 142 extending from the key cap 112, and the openings 140 are sized and arranged to receive a corresponding one of the key stems. Although the bellows 138 in the present keyboard 100 is a single piece configured to bend/flex during opening and closing of the keyboard, it can also be a plurality of sections that slide relative to each other during opening and closing of the keyboard (not shown).

Each of the key stems 142 is arranged in alignment with a corresponding dome 144 provided on a dome sheet 146, which is located on top of a corresponding printed circuit board or PCB 148. As seen in FIGS. 2A and 2B, each column 108 of keys 106 includes its own PCB 148 and dome sheet 146, such that in the present disclosure, there are 12 PCBs, each PCB being in alignment with a corresponding one of the columns. Each PCB 148 includes one of the dome sheets 146, which includes a corresponding dome 144 for each of the keys 106 (it is also appreciated that in other embodiments, there could be more than one key associated with each dome, although such a configuration is not shown or further described herein). To maintain communication between the PCBs 148, each PCB is connected to its adjacent PCB by a flex 150.

The expansion mechanism 118 is provided between the bellows 138 and the domes 144, and more specifically is arranged such that the key stems 142 are arranged between corresponding pairs of arms 120 of the mechanism. It is contemplated that this arrangement prevents the keys 106 from interfering with the mechanism 118 during operation thereof, which will be described in further detail below.

Operation of the keys 106 of the keyboard 100 is similar to that of conventional physical keyboards. Specifically, when a user actuates one of the keys 106, the key cap 112 is depressed, causing the key stem 142 to engage the corresponding dome 144. Upon engagement, a circuit (not shown) on the dome sheet 146 is closed and a signal is sent to the PCB 148, which is in communication (via Bluetooth or other wireless capability) with a processor on a corresponding device (not shown). The character associated with the actuated key is then input and shown on a display screen of the device. It is contemplated that the keyboard 100 can also be in wired communication with the corresponding device via a USB plug or similar hardwired connection.

When the keyboard 100 is in the closed configuration, as shown in FIGS. 1A-2B, the rows 110 of keys are arranged such that adjacent keys are in contact with each other; in other words, there is "zero gap" between adjacent keys in the same row, thus providing a small form factor when the keyboard is in the closed configuration. Although not required, in the present disclosure, the rows 110 of keys are separated by frets 152, which can be made of metal, plastic, or any other durable and rigid material. Frets 152 can be a useful tactile guide for the user while typing to help identify where the next row of keys is located, for example.

The columns 108 are arranged such that the keys 106 in each column are vertically aligned with each other. As indicated above and seen in FIG. 1B, the space bar 114 is arranged such that it is the same width as five of the keys 106, and is placed in the bottom row 116 of the keyboard such that the keys 106 on either side thereof are still in vertical alignment with the keys located directly above them and in the same column 108. The space bar 114 shares a common PCB 148 and dome sheet 146 with the keys 106 in the sixth column 108 of keys (identified in FIG. 1B as column 108f), although it is contemplated that other configurations may be possible.

The present keyboard 100 is configured for use as a transportable accessory for a portable device. Most conventional accessory keyboards have been reduced in size to increase ease of portability and travel. However, such a reduced size may result in user discomfort due to typing on such small key surfaces, and others may be used to a conventional-sized keyboard and find typing difficult on a reduced size keyboard. In still other scenarios, some users may wish to use the portable or reduced size keyboard in some instances but may desire a full-size keyboard in other instances.

In the present disclosure, the keyboard 100 can be functional in both the closed configuration (as shown and described above with respect to FIGS. 1A-2B), and in the expanded configuration, as will be described below. While the keyboard 100 is in the closed configuration, the user can touch-type thereon (i.e., with four fingers of each hand located on keys 106 and the thumbs of each hand located on the space bar 114). As the keyboard 100 is smaller in size when in the closed configuration, the keyboard can be used in locations where space is an issue, and can also more easily fit into a user's bag or luggage, for example.

Figure 3A:
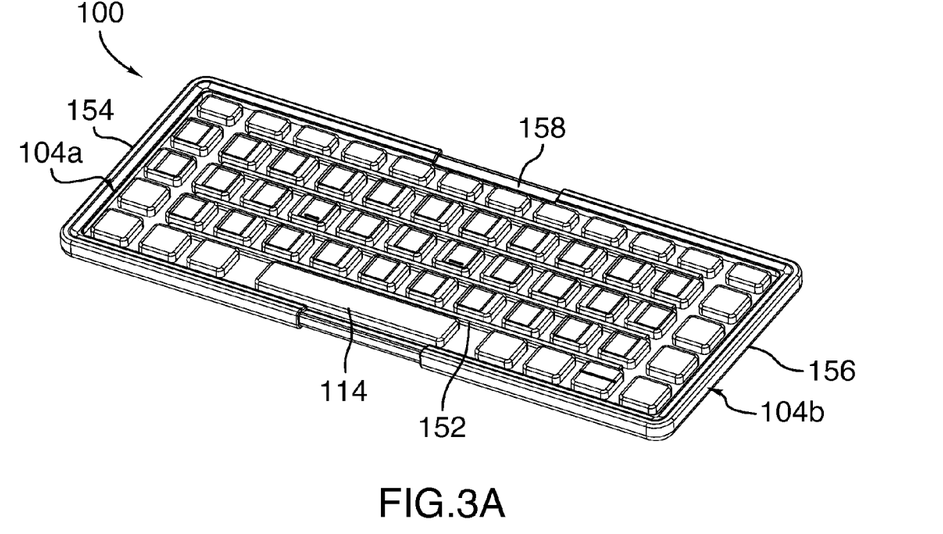
FIG. 3A is a top perspective view of the keyboard in an expanded configuration.
Figure 3B:
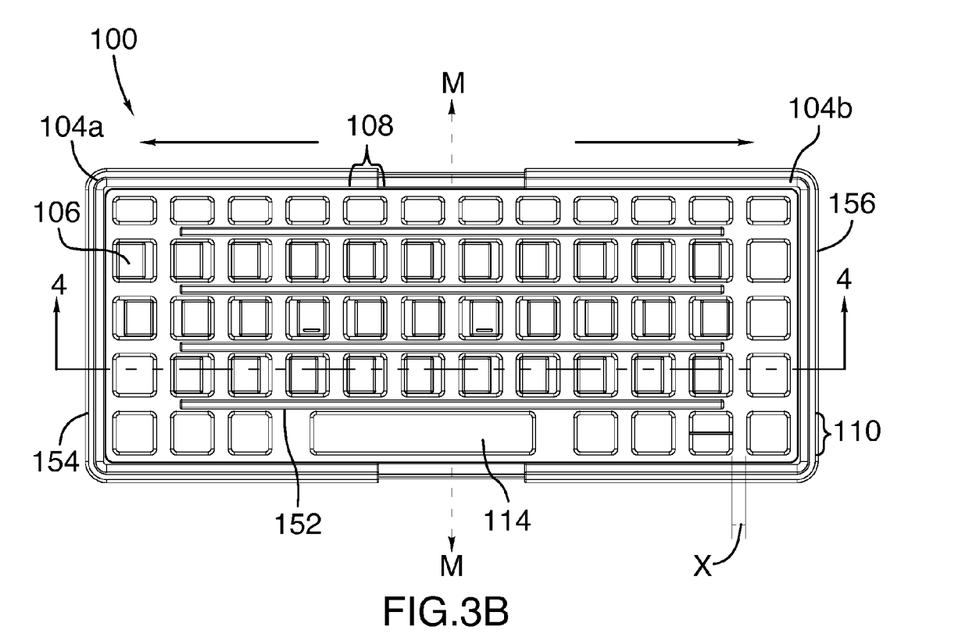
FIG. 3B is a top plan view of the keyboard in the expanded configuration.
Figure 3C:
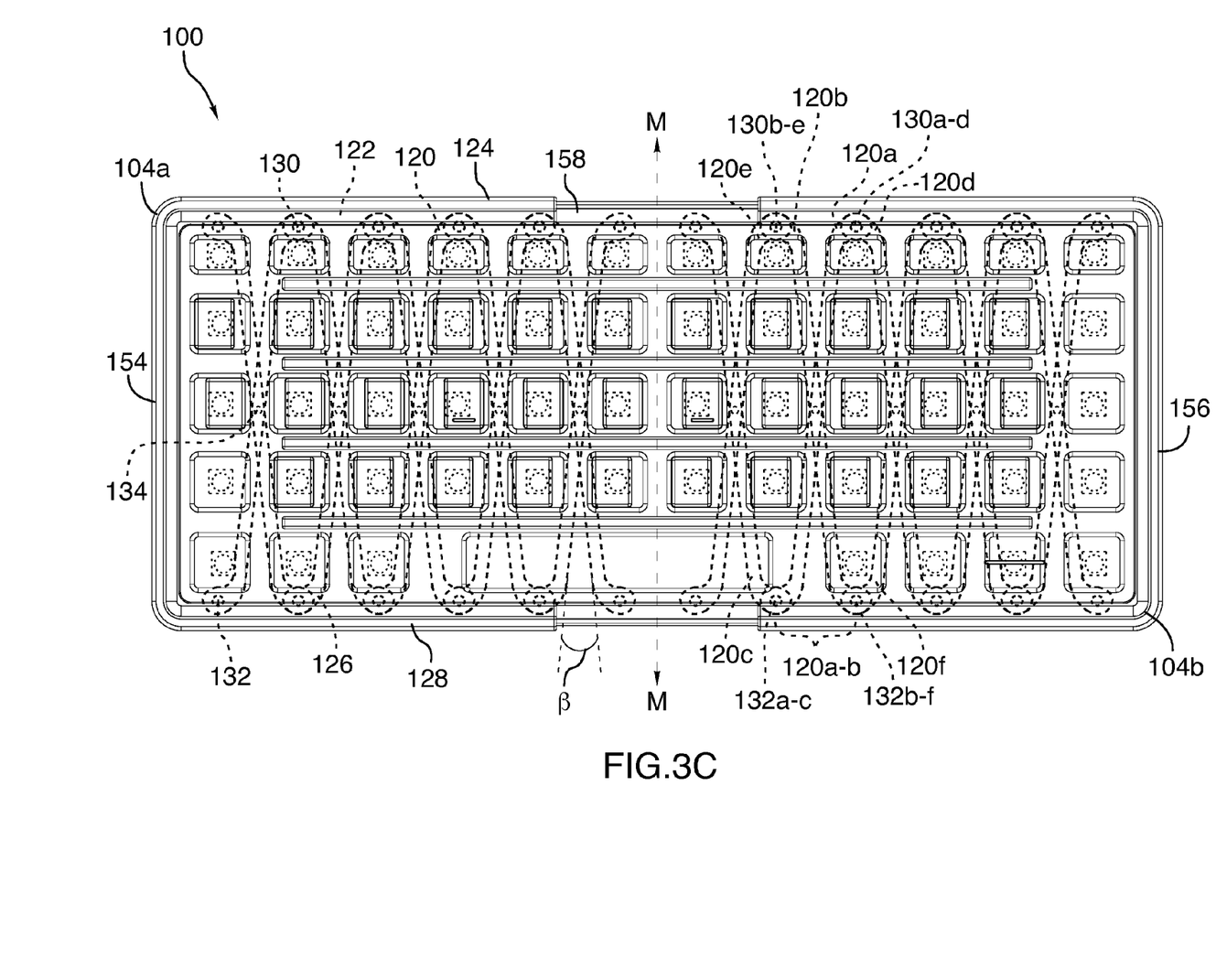
FIG. 3C is a top plan view of the keyboard showing the expansion mechanism housed within the keyboard when the keyboard is in the expanded configuration.

When the user wishes to access the full-sized keyboard, the present keyboard 100 can be transitioned from the closed configuration to the expanded configuration by utilizing the expansion mechanism 118 described above. Specifically, as shown in FIGS. 3A-3C, to use the keyboard 100 in the expanded configuration, the user grasps the keyboard at first and second sides 154, 156 of the frame 104 (which are substantially perpendicular to the top and bottom sides 124, 128 of the frame) and pulls in the direction of the arrows shown in FIG. 3B. As the keyboard 100 moves to the expanded configuration, the frame 104 is divided into two oppositely moving components 104a, 104b, each of which slides along a rail 158 in the direction indicated.

As the keyboard 100 is moved to the expanded configuration, the columns 108 of keys 106 move apart from each other, with the columns of keys to the left of the midline M moving in a leftward direction, and the columns of keys to the right of the midline M moving in a rightward direction until the keyboard has reached its fully expanded configuration. As can be seen in FIGS. 3A and 3B, when the keyboard 100 is in the fully expanded position, the keys 106 in corresponding columns 108 remain in vertical alignment with each other, similar to the configuration of the columns 108 in the closed configuration, except that the columns of keys are now spaced apart from each other a distance "x". In the present keyboard 100, the distance x is approximately 19 mm, which is a typical distance or pitch utilized in many conventional full size keyboards. However, it is appreciated that the distance x can be increased or decreased to suit the application.

Figure 4A:
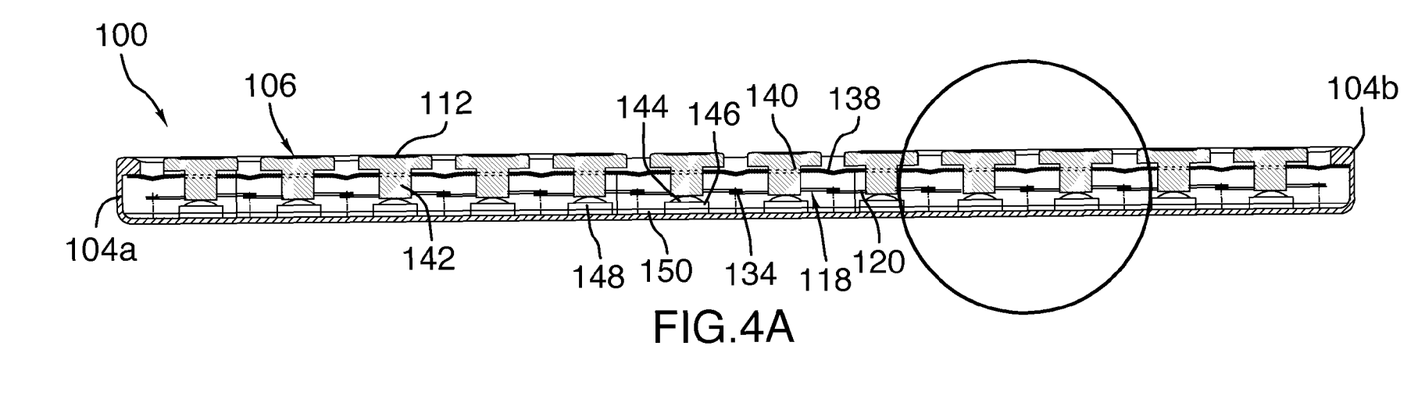
FIG. 4A is a cross-section front view of the keyboard in FIG. 3B taken along the line 4-4 and in the direction indicated.

During expansion of the keyboard 100, the expansion mechanism 118 moves from a compact or closed configuration to an expanded configuration. More particularly, and as shown in FIGS. 3C-4B, as the keyboard 100 expands, the arms 120 move in a scissor-like fashion such that the angle a defined by the pairs of arms 120 increases to an angle β.

Figure 4B:
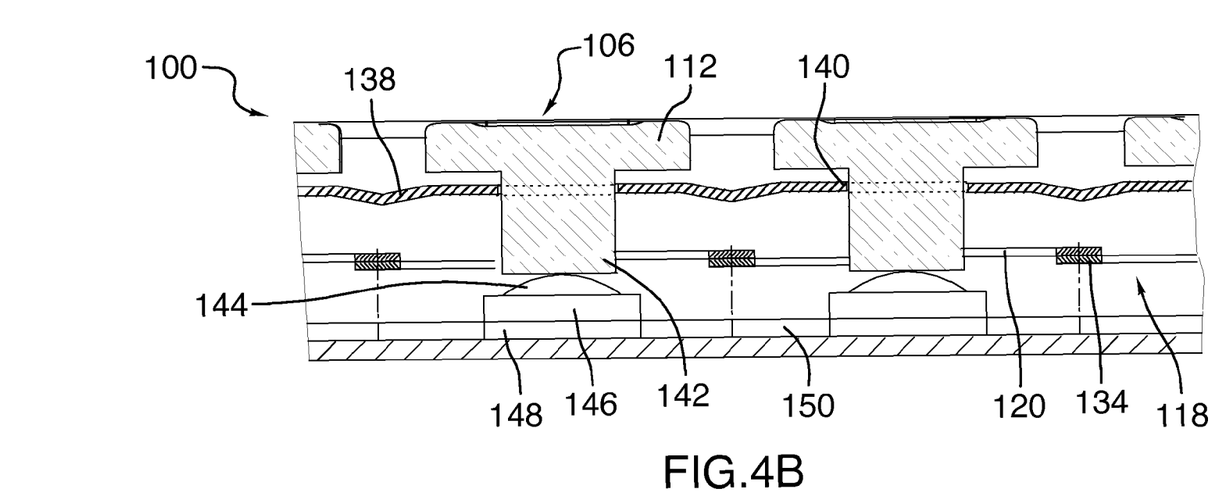
FIG. 4B is a close-up cross-section front view of the keyboard in FIG. 4A.

Specifically, referring again to arms 120a-f, as the keyboard 100 expands, the expansion mechanism 118 starts to translate from the compact configuration to the expanded configuration, with the columns 108 of keys 106 moving apart from each other in column-by-column succession. As the pairs of arms (such as the pair of arms 120a-b) expand, the arms pivot about their respective central pin (such as the central pin 134a-b) until they reach a stopping or end point. Although not shown herein, the stopping point for each pair of arms 120 can be indicated by a stop or detent provided on the expansion mechanism 118 or along the rail 156, for example, thereby ensuring that each column 108 of keys 106 has a specific limit and does not move past that limit.

The expansion or pivoting of the pairs of arms causes the first half and second half of the frame 104a, 104b to move along the rail 156 in opposite directions, thereby moving the columns 108 of keys 106 away from each other, starting with the column of keys closest to the midline M and ending with the column of keys closest to the first or second side 154, 156 of the keyboard 100. When a corresponding column 108 of keys 106 reaches its stopping point, it drives the next column of keys to move until it reaches its respective stopping point, and so on until each of the columns of keys is spaced apart the distance x from the adjacent column of keys.

Once the frame halves 104a and 104b have been pulled fully apart and reached the end of their travel along the rail 156, the keyboard 100 is fully expanded and the columns 108 of keys 106 are now separated by the distance "x". To maintain the fully expanded configuration of the keyboard 100, the rail 156 can include at least one end stop or detent (not shown) provided thereon that engages a corresponding opening in the frame 104 (not shown), although it is contemplated that other mechanisms may be possible to maintain the keyboard in the fully extended configuration (such as a tab and hook closure or a snap fit closure).

The flexes 150 connecting each of the columns 108 of keys 106 also expand during opening of the keyboard and are in fully extended positions (as seen in FIGS. 4A and 4B) when the keyboard 100 is in the expanded configuration. In addition, as the expansion mechanism 118 expands during movement of the keyboard 100, the bellows 138 also unfolds and stretches to an extended position. Accordingly, the expansion mechanism 118 is still hidden from external view when the keyboard 100 is in the expanded configuration.

Figure 5:
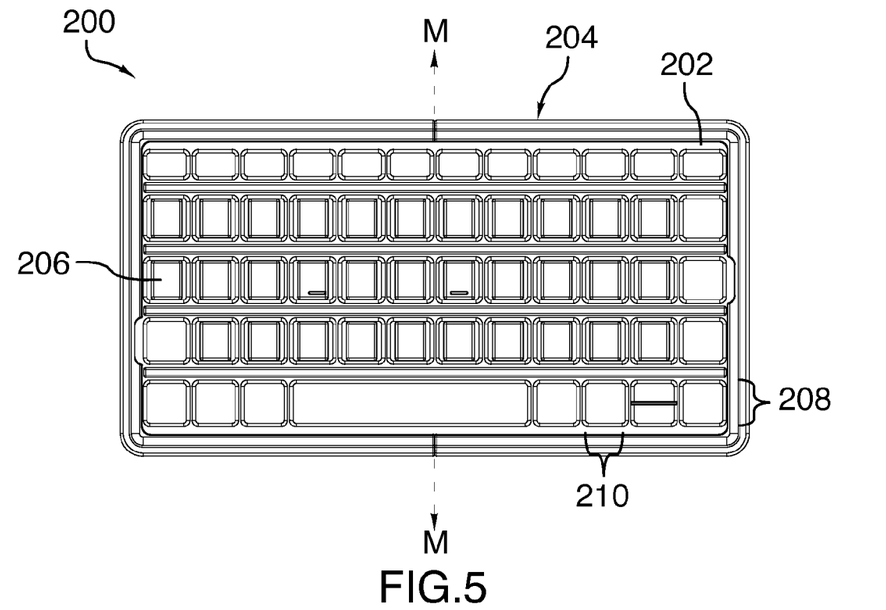
FIG. 5 is a top plan view of another embodiment of an expandable keyboard in a closed configuration.
Figure 6:
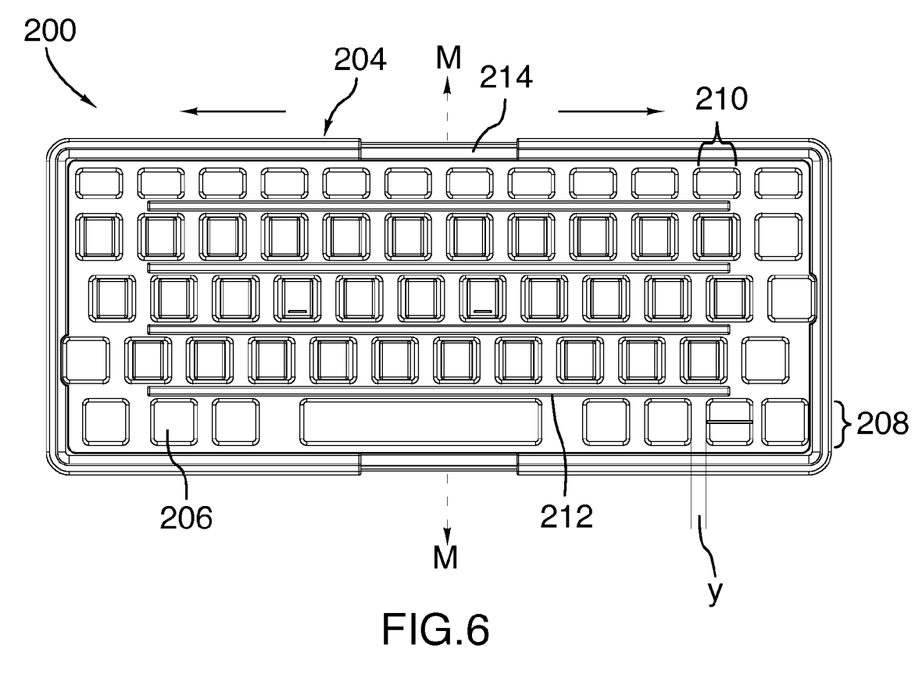
FIG. 6 is a top plan view of the keyboard in FIG. 5 in an expanded configuration.

FIGS. 5 and 6 depict an alternate embodiment of a keyboard 200 in accordance with the present disclosure. The keyboard 200 includes a housing 202 having a frame 204 that surrounds an outer periphery of the housing. The keyboard 200 further includes a plurality of keys 206 arranged in a plurality of rows 208 and columns 210. The housing 202 includes an expansion mechanism and bellows (not shown) that allows the keyboard to transition from a closed configuration to an expanded configuration. The expansion mechanism in the keyboard 200 can also be a scissors-like mechanism similar to the expansion mechanism 118 described above or it can be a conventional spring-loaded slider mechanism, for example.

As can be seen in FIG. 5, in the closed configuration, the keys 206 are arranged in vertically aligned columns 210, and the rows 208 of keys are separated by frets 212, similar to the keyboard 100. The rows 208 of keys are also configured such that adjacent keys 206 are in contact with each other, thus creating a "zero-gap" row of keys.

When the keyboard 200 is transitioned to the expanded configuration (FIG. 6) using the expansion mechanism, the frame 204 moves along a corresponding rail 214, activating the expansion mechanism and causing the columns 210 of keys 206 to move such that they are separated a distance "y" from each other. In the expanded configuration, it can be seen that the keys 306 are arranged such that they are vertically offset from each other. In other words, the columns 210 of keys 206 are arranged in a staggered manner, similar to a conventional full-size keyboard. To provide such a staggered arrangement in the expanded configuration, the expansion mechanism for the keyboard 200 can be configured such that rows 208 of keys 206 are each provided on a single PCB and dome sheet (not shown). Accordingly, when the keyboard 200 is pulled apart, some of the rows 208 move in a leftward direction, and some of the rows move in a rightward direction. Similar to the expansion mechanism 118 described with respect to FIGS. 1-4B, the PCBs can be attached to each other by a flex (not shown) that enables connection between the rows 208 in both the compact and expanded configurations. Alternatively, the expansion mechanism can be arranged such that each key 206 has its own PCB and dome sheet, with each PCB being attached to an adjacent PCB by a flex, thus enabling individual movement of the keys when the keyboard 200 transitions between the closed and expanded configurations.

Figure 7:
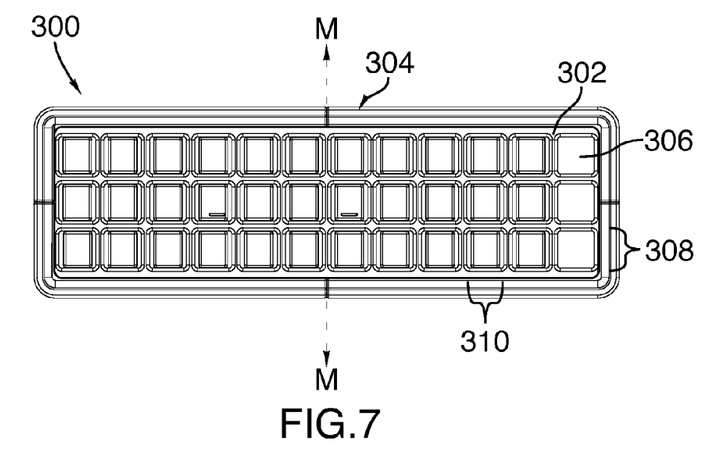
FIG. 7 is a top plan view of yet another embodiment of an expandable keyboard in a closed configuration.
Figure 8:
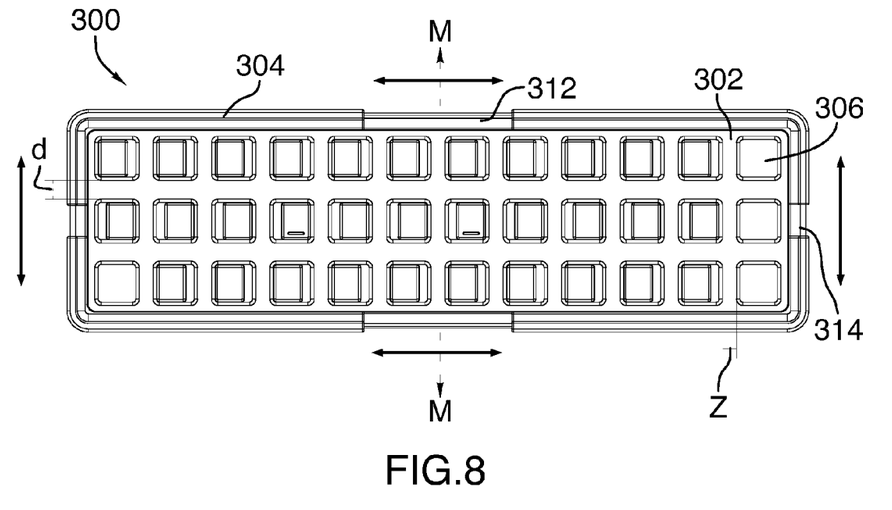
FIG. 8 is a top plan view of the keyboard in FIG. 7 in an expanded configuration.

FIGS. 7 and 8 show a further alternate embodiment of a keyboard 300 in accordance with the present disclosure. The keyboard 300 includes a housing 302 having a frame 304 that surrounds an outer periphery of the housing. The keyboard 300 also includes a plurality of keys 306 arranged in a plurality of rows 308 and columns 310. In a closed configuration, as seen in FIG. 7, the columns 310 of keys are arranged in a vertically aligned manner, and keys 306 in adjacent rows 308 and columns 310 are in direct contact with each other; in other words, keyboard 300 does not include frets or spacing between the rows of keys in the closed configuration. The keyboard 300 also includes an expansion mechanism (not shown) that allows for transition between the closed configuration and an expanded configuration (shown in FIG. 8). As indicated above, the expansion mechanism for the keyboard 300 can be a scissor-like mechanism similar to the expansion mechanism 118 described above or can be a conventional spring-loaded slider mechanism or similar apparatus that enables controlled sliding, for example.

To move the keyboard 300 from the closed configuration to the expanded configuration, the user pulls the frame 304 apart in both a vertical direction and a horizontal direction, such that the frame slides in the horizontal direction along a rail 312 and the frame slides in the vertical direction along a rail 314, as indicated by the arrows in FIG. 8. Such movement causes the expansion mechanism to move the keys 306 such that the keys separate from each other in both the horizontal and vertical directions, resulting in columns 308 of keys 300 that are evenly spaced apart a distance "z" and rows 310 of keys that are spaced apart a distance "d". The rows 310 and columns 308 of keys 300 are vertically and horizontally aligned. Detents or stops (not shown) can be provided within the frame 304 to lock the keyboard 300 in the expanded configuration. Although not shown, the expansion mechanism in the keyboard 300 can include separate PCBs and dome sheets for each of the keys 306, with the PCBs being connected to each other by flex connectors (not shown). As the keyboard 300 transitions to the expanded configuration, the expansion mechanism expands and the flex connectors extend, allowing for controlled movement. The keyboard 300 can also include a bellows (not shown) similar to the bellows 138 described above, which hides the expansion mechanism from view in both the closed and expanded configurations.

The present keyboards 100, 200, and 300 each provide a portable accessory that can be used in both closed and expanded configurations. Alternatively, it is appreciated that the keyboards 100, 200 and 300 could be configured such that they are only functional in the expanded configuration, for example when the user places the keyboard in a bag or purse in the closed configuration, the keyboard is not functional, but when the user removes the keyboard and expands the same, it becomes operational. The keyboards 100, 200, 300 each include an internal expansion mechanism that allows for controlled and precise movement of the columns/rows of keys between the closed and expanded configurations.

While a particular embodiment of the present keyboard has been described herein, it will be appreciated by those skilled in the art that changes and modifications may be made thereto without departing from the disclosure in its broadest aspects and as set forth below.

The invention claimed is:

1. A keyboard comprising:
a housing;
a frame surrounding the housing;
a plurality of keys arranged in a plurality of columns and rows wherein all side edges of each of the keys comprise substantially straight side edges, each of the plurality of keys comprising an actuator extending from a bottom surface of the key; and
an expansion mechanism provided in the housing and configured for enabling movement of the keyboard between fully-closed and expanded configurations, where each actuator is arranged between corresponding pairs of arms of the expansion mechanism, and
wherein the keyboard is movable between the fully-closed configuration and the expanded configuration, the plurality of keys being accessible in both the fully-closed and expanded configurations and wherein the plurality of keys are functional regardless of whether the keyboard is in the fully-closed configuration or the expanded configuration.

2. The keyboard of claim 1 wherein in the closed configuration, each of the keys in a corresponding one of the columns is vertically aligned with each other, and in the expanded configuration, each of the keys in the corresponding one of the columns is vertically aligned with each other.

3. The keyboard of claim 1 wherein in the closed configuration, each of the keys in a corresponding one of the columns are vertically aligned with each other, and in the expanded configuration, each of the keys in the corresponding one of the columns are vertically offset from each other.

4. The keyboard of claim 1 wherein each of the keys includes a dome sheet having a corresponding dome, each of the domes being in registry with a corresponding one of the keys.

5. The keyboard of claim 4 wherein each of the keys includes an actuator and a key cap, the actuator configured for engaging a corresponding one of the domes upon actuation of the key.

6. The keyboard of claim 1 wherein each of the columns is associated with a flexible PCB, each of the keys in a corresponding one of the columns being in communication with the corresponding PCB.

7. A keyboard comprising:
a housing;
a frame surrounding the housing;
a plurality of keys being arranged in a plurality of rows and a plurality of columns wherein all side edges of each of the keys comprise substantially straight side edges, each of the plurality of keys comprising an actuator extending from a botton surface of the key; and
an expansion mechanism provided in the housing and configured for enabling movement of the keyboard between fully-closed and expanded configurations, where each actuator is arranged between corresponding pairs of arms of the expansion mechanism, and
wherein the keyboard is movable between the fully-closed configuration and the expanded configuration, the keys being accessible in both the fully-closed and expanded configurations and wherein the plurality of keys are functional regardless of whether the keyboard is in the fully-closed configuration or the expanded configuration.

8. The keyboard of claim 7 wherein each of the keys in a corresponding one of the columns is vertically aligned in both the closed and the expanded configurations.

9. The keyboard of claim 7 wherein each of the keys in a corresponding one of the columns are vertically aligned in the closed configuration and vertically offset from an adjacent key in the expanded configuration.

10. The keyboard of claim 7 wherein each of the columns of keys is associated with a corresponding flexible PCB.

11. The keyboard of claim 7 wherein each of the rows of keys is associated with a corresponding flexible PCB.

12. The keyboard of claim 7 wherein each of the keys is associated with a corresponding flexible PCB.

13. A keyboard comprising:
a housing;
a frame surrounding the housing;
a plurality of keys arranged in a plurality of columns and a plurality of rows wherein all side edges of each of the keys comprise substantially straight side edges, each of the plurality of keys comprising a key cap and an actuator extending from a bottom surface of the key cap;
a plurality of flexible PCBs, each PCB configured to correspond with one of the columns; and
an expansion mechanism provided in the housing and configured for enabling movement of the keyboard between fully-closed and expanded configurations, where each actuator is arranged between corresponding pairs of arms of the expansion mechanism; and
an expandable layer surrounding each of the plurality keys, the expandable layer comprising a plurality of regions each receiving a corresponding one of the actuators, the expandable layer being situated below a bottom surface of the key cap and above the expansion mechanism, wherein the keyboard is movable between the fully-closed configuration and the expanded configuration, the keys being accessible in both the fully-closed and expanded configurations, wherein the plurality of keys are functional regardless of whether the keyboard is in the fully-closed configuration or the expanded configuration, and wherein the expandable layer is in a contracted state when the keyboard is in the fully-closed configuration and is in an expanded state when the keyboard is in the expanded configuration.

14. The keyboard of claim 13 wherein each of the PCBs is connected to an adjacent PCB by a flex.

15. The keyboard of claim 13 wherein in the closed configuration, each of the keys in a corresponding one of the columns is vertically aligned with each other.

16. The keyboard of claim 13 wherein in the expanded configuration, each of the keys in a corresponding one of the columns are vertically offset from each other.

17. The keyboard of claim 13 further including a bellows in the housing configured for concealing the expansion mechanism.

* * * * *